(12) United States Patent
Ramaswamy et al.

(10) Patent No.: US 9,142,230 B2
(45) Date of Patent: Sep. 22, 2015

(54) MAGNETIC DEVICES INCLUDING LOW THERMAL CONDUCTIVITY PORTION

(71) Applicant: SEAGATE TECHNOLOGY LLC, Cupertino, CA (US)

(72) Inventors: Vasudevan Ramaswamy, Edina, MN (US); Erik Jon Hutchinson, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/788,574

(22) Filed: Mar. 7, 2013

(65) Prior Publication Data

US 2014/0254044 A1    Sep. 11, 2014

(51) Int. Cl.
*G11B 5/31* (2006.01)
*G11B 5/60* (2006.01)

(52) U.S. Cl.
CPC .............. *G11B 5/314* (2013.01); *G11B 5/3133* (2013.01); *G11B 5/607* (2013.01)

(58) Field of Classification Search
CPC .......... G11B 5/31; G11B 5/3133; G11B 5/33; G11B 5/3903; G11B 5/596; G11B 5/6011; G11B 5/607

USPC .................... 360/294.7, 319, 125.31, 125.32, 360/125.74, 125.75, 320
See application file for complete search history.

(56) References Cited

U.S. PATENT DOCUMENTS

| | | | |
|---|---|---|---|
| 6,396,670 B1 | 5/2002 | Murdock | |
| 7,609,480 B2 * | 10/2009 | Shukh et al. | 360/125.74 |
| 7,894,160 B2 * | 2/2011 | Kobayashi et al. | 360/125.31 |
| 7,983,005 B2 * | 7/2011 | Ohtsu et al. | 360/234.5 |
| 2003/0099054 A1 * | 5/2003 | Kamijima | 360/59 |
| 2005/0135012 A1 * | 6/2005 | Kubotera | 360/236.3 |
| 2006/0034013 A1 * | 2/2006 | Kato et al. | 360/128 |
| 2006/0077591 A1 * | 4/2006 | Kurihara et al. | 360/128 |
| 2007/0247758 A1 * | 10/2007 | Kurita et al. | 360/234.7 |
| 2008/0023468 A1 | 1/2008 | Aoki | |
| 2008/0024896 A1 * | 1/2008 | Ohta et al. | 360/59 |
| 2008/0225427 A1 * | 9/2008 | Liu | 360/75 |

* cited by examiner

*Primary Examiner* — Jefferson Evans
(74) *Attorney, Agent, or Firm* — Mueting, Raasch & Gebhardt, P.A.

(57) ABSTRACT

A device including a magnetic transducer; top and bottom magnetic shields, wherein the top and bottom magnetic shields are adjacent the magnetic transducer on opposite surfaces thereof; a heating element configured to provide heating along a heating path towards the first and second magnetic shields; and a low thermal conductivity structure, wherein at least a portion of the low thermal conductivity structure is positioned along the heating path between the heating element and the magnetic transducer.

17 Claims, 9 Drawing Sheets

MAGNETIC DEVICES INCLUDING LOW THERMAL CONDUCTIVITY PORTION

BACKGROUND

Commonly utilized magnetic storage devices incorporate a heating element in order to initiate thermal protrusion of the magnetic read head located at the transducer's air bearing surface (ABS). Thermal protrusion allows the read head of the magnetic device to be moved closer to the magnetic media, thereby gaining advantages in areal density. The materials and structures of the magnetic read heads can be adversely affected by the additional heat as they are not necessarily chosen and processed to be insensitive to high temperatures. Long term reliability of magnetic read heads may be enhanced by shielding certain portions of the magnetic read head from high temperatures.

SUMMARY

A device including a magnetic transducer; top and bottom magnetic shields, wherein the top and bottom magnetic shields are adjacent the magnetic transducer on opposite surfaces thereof; a heating element configured to provide heating along a heating path towards the first and second magnetic shields; and a low thermal conductivity structure, wherein at least a portion of the low thermal conductivity structure is positioned along the heating path between the heating element and the magnetic transducer.

A device including a magnetic transducer; top and bottom magnetic shields, wherein the top and bottom magnetic shields are adjacent the magnetic transducer on opposite surfaces thereof; a heating element configured to provide heating along a heating path towards the first and second magnetic shields; and a low thermal conductivity structure, wherein at least a portion of the low thermal conductivity structure is positioned below the bottom shield but above the heating element and at least another portion of the low thermal conductivity structure is positioned behind at least the bottom shield.

A device including a magnetic transducer; top and bottom magnetic shields, wherein the top and bottom magnetic shields are adjacent the magnetic transducer on opposite surfaces thereof; a heating element configured to provide heating along a heating path towards the first and second magnetic shields; and a low thermal conductivity structure, wherein at least a portion of the low thermal conductivity structure is positioned below the bottom shield but above the heating element, at least another portion of the low thermal conductivity structure is positioned behind at least the bottom shield, and the low thermal conductivity structure is made of a material having a thermal conductivity of less than about 25 W/mK.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
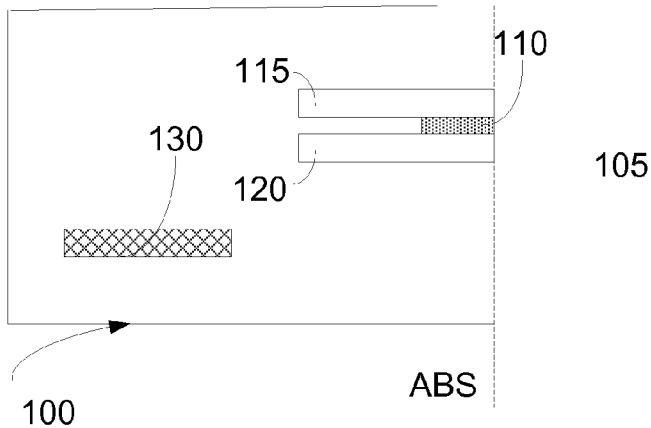
FIG. 1A illustrates a cross-section of a device without a low thermal conductivity structure.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Data storage systems generally include a magnetic transducer that functions to read the data stored on magnetic storage media, such as a magnetic disk drive. During a read event, the magnetic transducer utilizes heat, input from a heating element to thermally deform the air bearing surface (ABS) of the head to bring the magnetic read element closer to the magnetic media for efficient read back of data stored thereon. The magnetic media, which in a disc drive system is a spinning media disc, acts as a heat sink and draws the heat out from the ABS. This thermal protrusion, although advantageous for efficient and reliable read back, comes at the expense of having to expose the reader element, which is located in between two magnetic shields, to high temperatures. The shields and the components surrounding them act as the primary heat transport from the heater to the reader element. If the reader could be kept "cool" and stable by restricting the heat flow into the reader shields while still allowing thermal protrusion of the ABS, the advantages could be gained without the detrimental effects.

Disclosed devices seek to keep the reader cool by modifying the thermal conductivity of the components adjacent to the shields and reader. In effect, disclosed devices increase the thermal resistance in the path of heat flow from the heating element to the shields by incorporating suitable material and geometries. Thermal resistance can be defined as $L/(K*A)$, where L is the length of the material in the direction parallel to heat flow, K is the thermal conductivity of the material, and A is the area of cross-section in the direction of heat flow. Based on this equation, for a given geometry, a lower thermal conductivity translates into a higher thermal resistance.

FIG. 1A shows a side view of a cross section of a portion of an example of a previously utilized magnetic device 100 or magnetic head. Not all components of the magnetic device 100 are shown in the included figures, one of skill in the art will know and understand other components that may or may not be present in some embodiments. Further details regarding the various components that are disclosed herein are also generally known to one of skill in the art, and will therefore not be discussed herein.

Figure 1B:
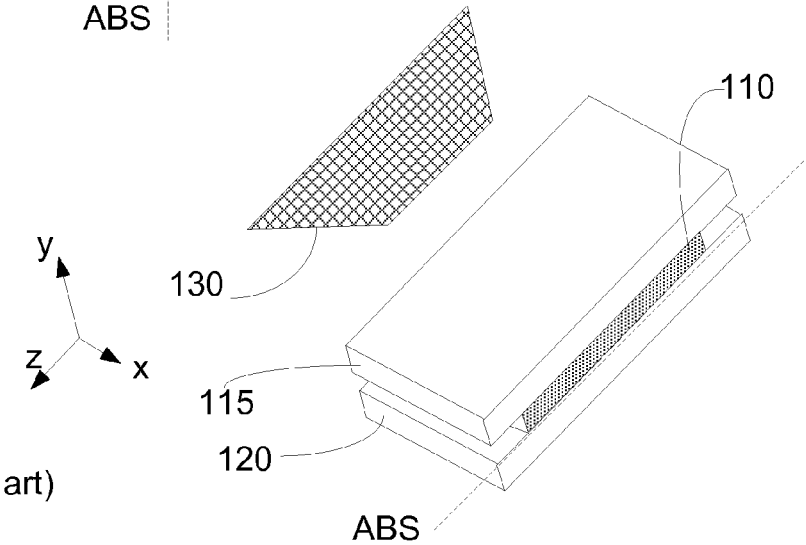
FIG. 1B shows an isometric view of the same device.
Figure 1C:
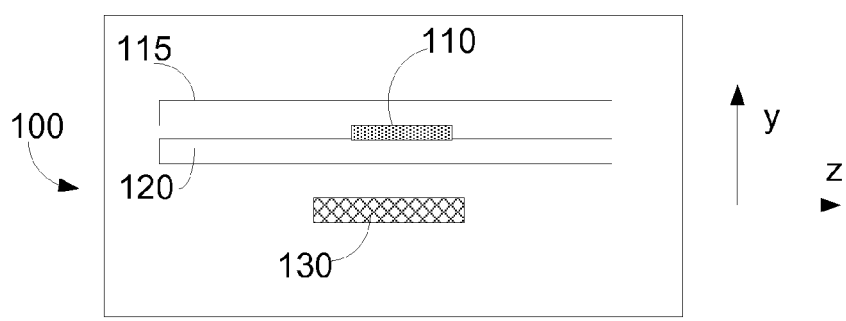
FIG. 1C shows a cross section of the device parallel to the plane of the ABS.

The exemplary magnetic device 100 is depicted in proximity to a magnetic disc 105 that could be read with the exemplary magnetic device 100. This exemplary magnetic head 100 includes a magnetic transducer 110. The magnetic transducer 110 can also be referred to as a read element, or a magnetic read element. Surrounding the magnetic transducer 110 are a top shield 115 and a bottom shield 120. The top and bottom shields are positioned adjacent the magnetic transducer on opposite sides thereof. The top 115 and bottom 120 shields are magnetic shields. The magnetic transducer 110 is generally positioned and/or configured so that a surface thereof is adjacent the air bearing surface (ABS) of the device. The magnetic head 100 also includes a heating element 130. The heating element is generally positioned below the bottom shield 120 (i.e., in the y direction) but not directly adjacent to the bottom shield 120. The heating element 130 is generally configured to generate heat. The heat that is generated travels along a heating path. The heating path goes from the heating element 130 to the magnetic media (or more specifically disc) through the top shield 115, the magnetic transducer 110 and the bottom shield 120. FIG. 1B shows an isometric view of the same device and FIG. 1C shows a front view (looking at the device from the ABS), with like components numbered similarly in both views.

Figure 1D:
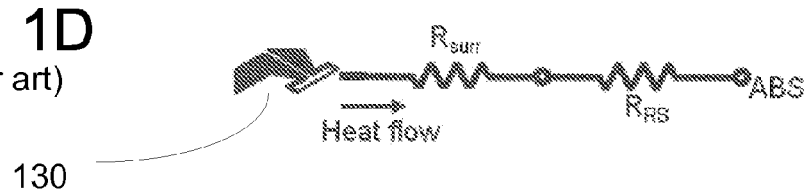
FIG. 1D illustrates a thermal circuit of the device.

The heating element 130 generates heat when activated. FIG. 1D illustrates the heating path in the magnetic device 100 when the heating element 130 is activated, as a thermal circuit. The heat from the heating element 130 is transmitted through the various surrounding materials having a thermal resistance ($R_{surr}$). It should be noted herein that the materials and structures making up the surrounding materials that form the thermal resistance ($R_{surr}$) are not depicted in FIGS. 1B, 1C, and 1D, but one of skill in the art, given this disclosure will understand what those structures and materials are. The heat then goes through the shields (top and bottom shields 115 and 120) having a thermal resistance ($R_{RS}$) before being expelled at the ABS into the ambience and/or the underlying magnetic disc.

Figure 2A:
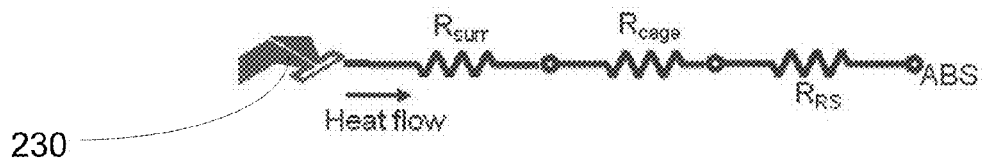
FIG. 2A illustrates a thermal circuit of a disclosed device.
Figure 2B:
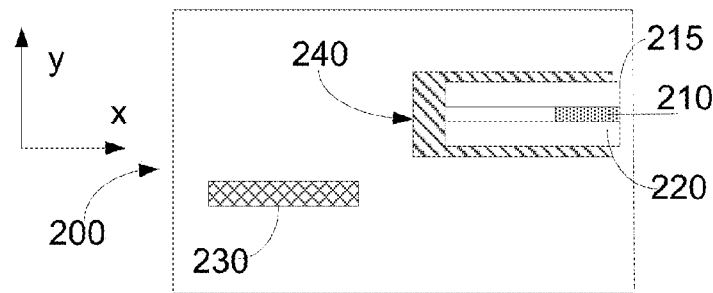
FIG. 2B illustrates a cross-section of a disclosed device with a low thermal conductivity structure.
Figure 2C:
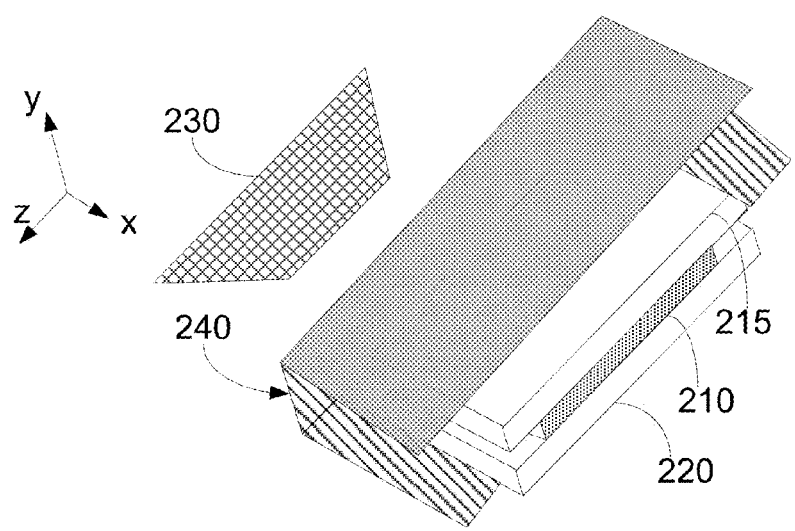
FIG. 2C shows an isometric view of the same device.
Figure 2D:
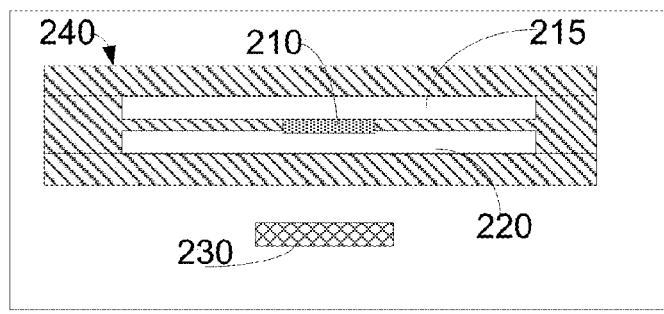
FIG. 2D shows a cross section of the device parallel to the plane of the ABS.

Disclosed devices, such as that pictorially depicted in FIGS. 2B, 2C, and 2D introduce another component in the thermal path. The additional component is placed in the heating path or heat flow path between the heating element and the magnetic transducer. In some disclosed embodiments, the additional component is referred to as a low thermal conductivity structure, but can also be referred to as a low thermal conductivity cage or simply a cage. FIG. 2A illustrates the heating path in a disclosed magnetic device 200 when the heating element 230 is activated, as a thermal circuit. The heat from the heating element 230 is transmitted through the various surrounding materials having a thermal resistance ($R_{surr}$). It should be noted herein that the materials and structures making up the surrounding materials that form the thermal resistance ($R_{surr}$) are not depicted in FIGS. 2B, 2C, and 2D, but one of skill in the art, given this disclosure will understand what those structures and materials are. The heat then goes through the cage ($R_{cage}$) before it goes through the shields (top and bottom shields 215 and 220) having a thermal resistance ($R_{RS}$) before being expelled at the ABS into the ambience and/or the underlying magnetic disc. The low thermal conductivity structure, low thermal conductivity cage, or simply cage has a structure and is made of a material so that the thermal resistance of the cage $R_{cage}$ is sufficiently greater than that of $R_{surr}$. In some embodiments, this causes the heat flow from the heating element to one or more of the top shield, the magnetic transducer, and the bottom shield to be reduced compared to a device without the low thermal conductivity structure. In some embodiments, this can cause the heat flow from the heating element to at least the magnetic transducer to be reduced compared to a device without the low thermal conductivity structure. Such embodiments can serve to reduce the heat flow into one or more of the magnetic transducer and the shields. In some embodiments, consequently, the temperature of the magnetic transducer 210 (positioned between the bottom shield 220 and the top shield 215) does not rise as much as it would without the low thermal conductivity structure.

FIGS. 2B, 2C, and 2D show side, isometric, and front views respectively of an embodiment of a disclosed device. Components are numbered similar to that of FIGS. 1A, 1B, and 1C, with this exemplary device 200 including a magnetic transducer 210, a top shield 215, a bottom shield 220, and a heating element 230. This exemplary device 200 also includes a low thermal conductivity structure 240. The low thermal conductivity structure can have various structures, examples of which are described herein below. In some embodiments, the low thermal conductivity structure can have any structure in which at least a portion of the low thermal conductivity structure is positioned along the heat path between the heating element 230 and the magnetic transducer 210. The thermal effect of this location in the heat path was demonstrated by FIG. 2A.

FIGS. 2B, 2C, and 2D show a low thermal conductivity structure 230 that is positioned between the heating element and the magnetic transducer in the heat path by being located below the bottom shield, above the top shield, and behind both the top and bottom shields. It should be noted that such a configuration is merely one example, and disclosed low thermal conductivity structures need not have such a configuration.

Disclosed devices can include low thermal conductivity structures that can provide decreased heating of the magnetic transducer from about 1° to about 10° C. less than without the low thermal conductivity structure. In some embodiments, disclosed devices can include low thermal conductivity structures that can provide decreased heating of the magnetic transducer from about 2° to about 10° C. less than without the low thermal conductivity structure. The degree of decreased heating can be tailored based on the material or materials chosen, the geometry and location of the low thermal conductivity structure, or combinations thereof.

Low thermal conductivity structures can be made of one or more than one kind of material. Exemplary materials can include materials having a thermal conductivity (K) that is not greater than, or is less than about 25 W/mK. In some embodiments exemplary materials for the low thermal conductivity structure can include materials having a thermal conductivity (K) that is less than about 20 W/mK. In some embodiments, the low thermal conductivity structure can include Constantan, Nichrome, or some combination thereof. In some embodiments, low thermal conductivity structures can include Nichrome. In some embodiments, the low thermal conductivity structure can include silicon carbide, silicon oxide, photoresist, amorphous carbon, or some combination thereof.

The coefficient of thermal expansion (CTE) of the material or materials chosen for the low thermal conductivity structure can also be considered. The CTE can be a relevant property to consider because the relative movement, upon heating, of the low thermal conductivity structure can affect the protrusion of the magnetic transducer at the ABS which can affect, either detrimentally or positively, the reader or head to media spacing (HMS) of the magnetic device. Therefore, when choosing a material(s) for the low thermal conductivity structure, its thermal conductivity (K) and its CTE, as well as the geometry and location of the low thermal conductivity structure (discussed below) may all be considered. Table 1 below shows reported thermal conductivities (K) and coefficient of thermal expansion (CTE) of various materials.

TABLE 1

| Material | Thermal Conductivity (K) Wm/K | Coefficient of Thermal Expansion (CTE) |
| --- | --- | --- |
| Constantan | 19.5 | $14.9 \times 10^{-6}$ |
| Nichrome | 11.3 | $14 \times 10^{-6}$ |
| Silicon Carbide | 3.6-4.9 | $2.77 \times 10^{-6}$ |
| Silicon oxide | 1.4 | $0.55 \times 10^{-6}$ |
| Photoresist | 0.2 | $4.05 \times 10^{-5}$ |
| Amorphous carbon | 0.3-10 | $1.5\text{-}7 \times 10^{-6}$ |
| Alumina | 40 | $5.8 \times 10^{-6}$ |

As discussed above, at least a portion of the low thermal conductivity structure is positioned along or in the heating path between the heating element and the magnetic transducer. In some embodiments, a low thermal conductivity structure can be positioned along or in the heating path between the heating element and the magnetic transducer by being positioned below the bottom shield but above the heating element. From looking back at FIG. 2B, it can be seen that although the heating element 230 and the bottom shield 220 are not in the same plane in the x direction, the heating element 230 is beneath or below the bottom shield 220 in the y direction. In that same embodiment, at least a portion of the low thermal conductivity structure 240 is positioned below the bottom shield but above the heating element (in the y direction). It should be noted that low thermal conductivity structures that have at least a portion thereof located below the bottom shield but above the heating element can also include structures located at other positions with respect to the other various portions of the magnetic device.

Figure 3A:
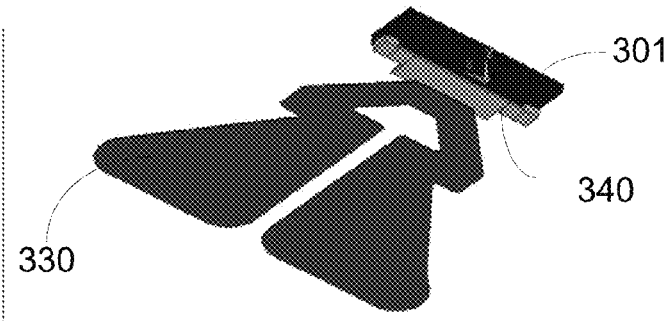
FIGS. 3A and 3B show isometric views of disclosed exemplary devices having low thermal conductivity structures positioned below the bottom shield but above the heating element.
Figure 3B:
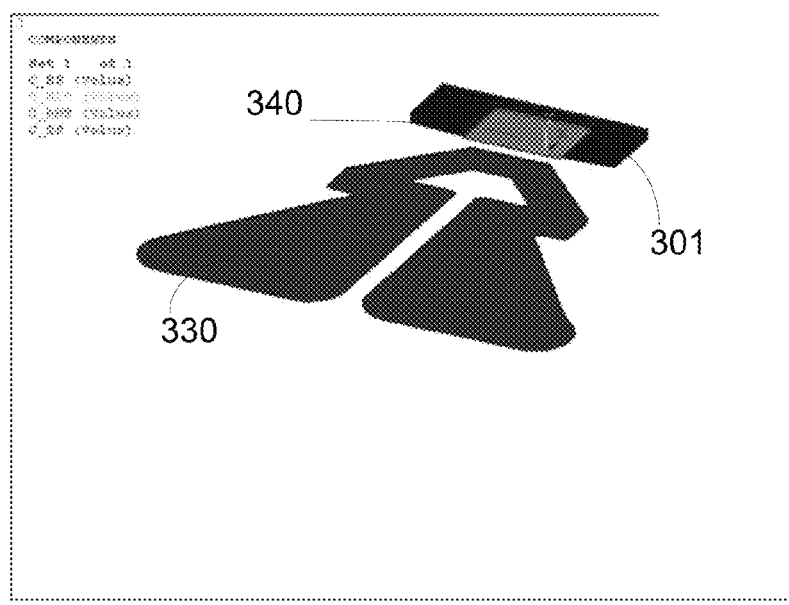
Figure 4A:
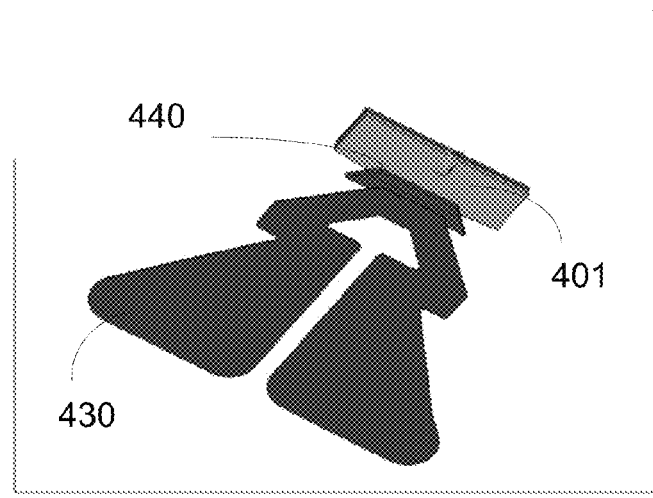
FIGS. 4A through 4K show isometric views of disclosed exemplary devices having low thermal conductivity structures positioned below the bottom shield but above the heating element and behind the bottom shield but in front of the heating element.
Figure 4B:
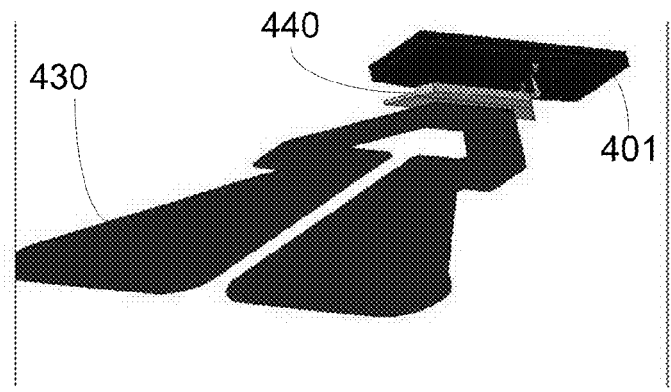
Figure 4C:
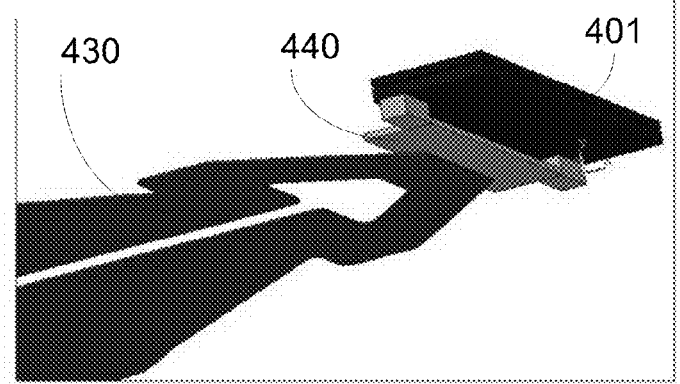
Figure 4D:
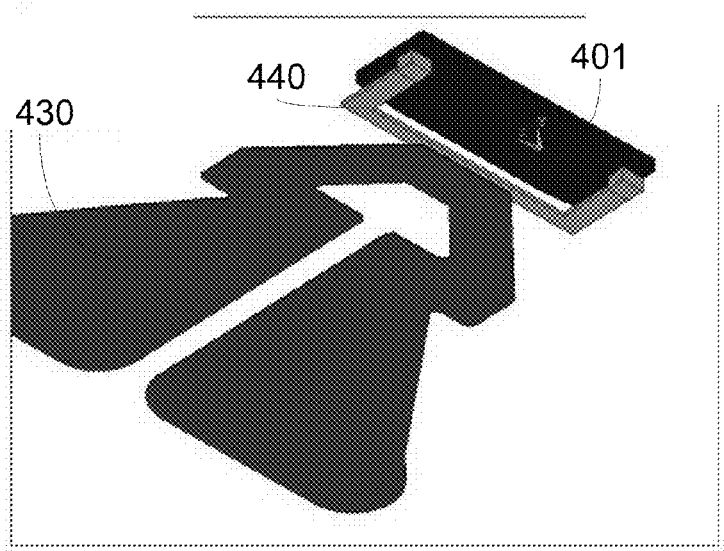
Figure 4E:
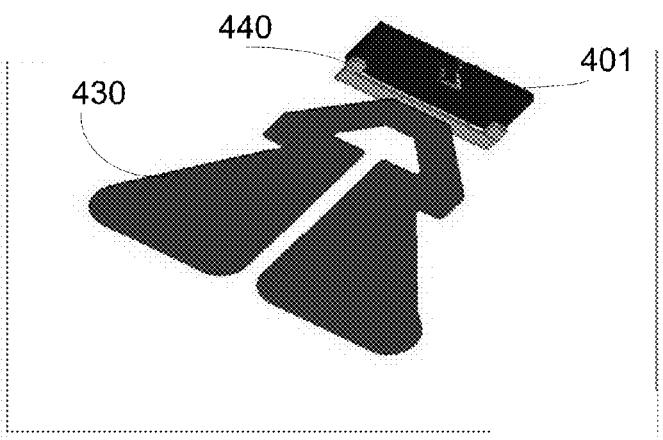
Figure 4F:
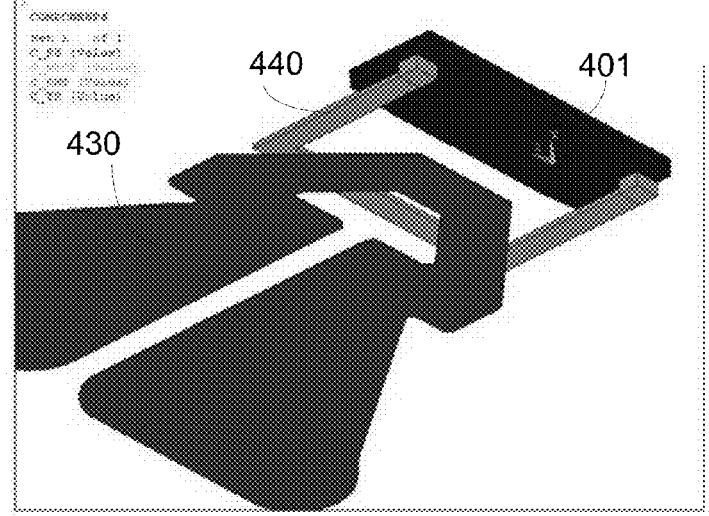
Figure 4G:
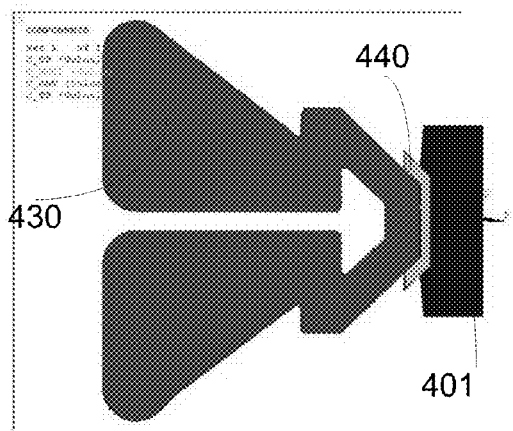
Figure 4H:
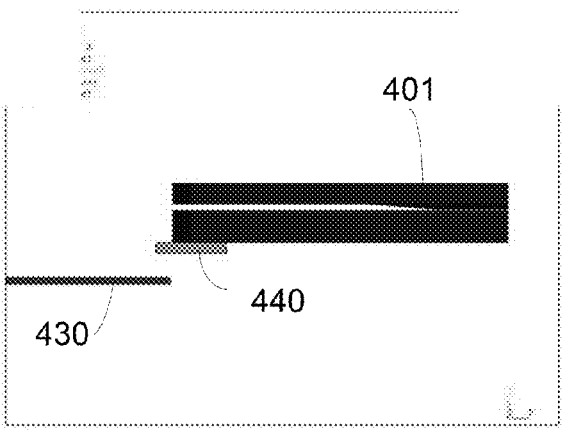
Figure 4I:
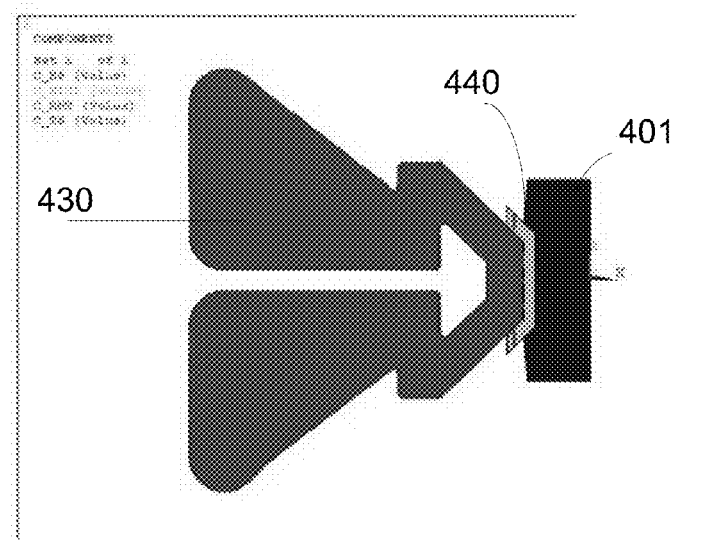
Figure 4J:
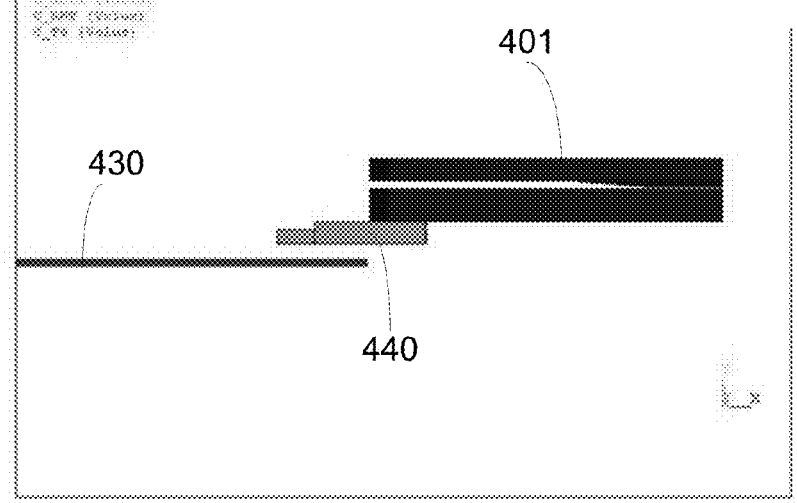
Figure 4K:
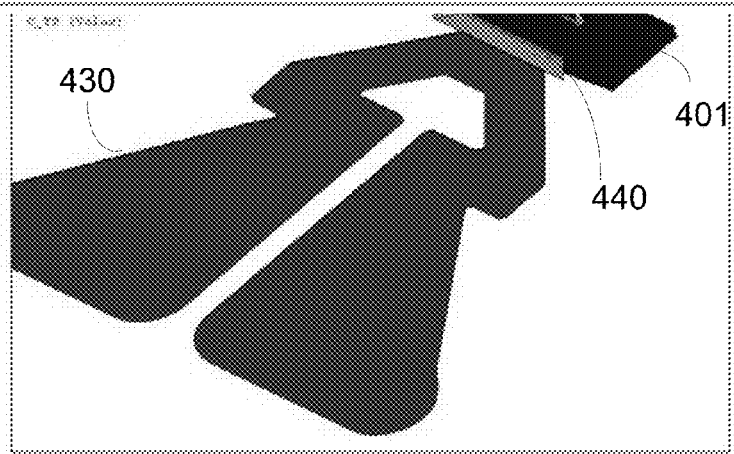
Figure 5A:
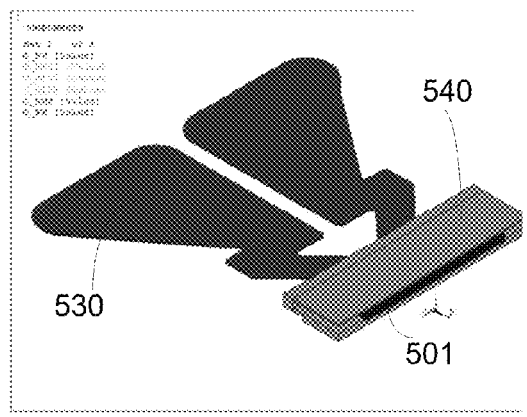
FIGS. 5A through 5E show isometric views of disclosed exemplary devices having low thermal conductivity structures positioned below the bottom shield but above the heating element, behind the bottom shield but in front of the heating element, and above the top shield.
Figure 5B:
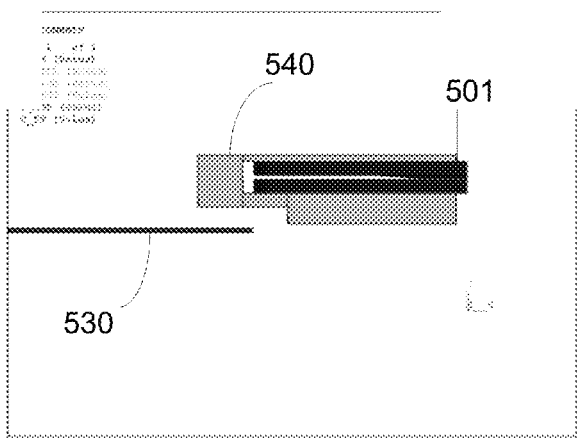
Figure 5C:
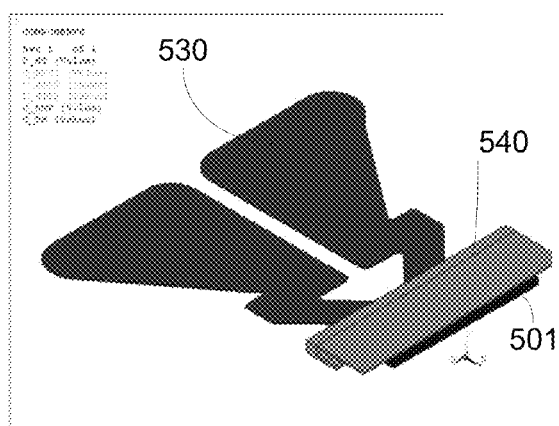
Figure 5D:
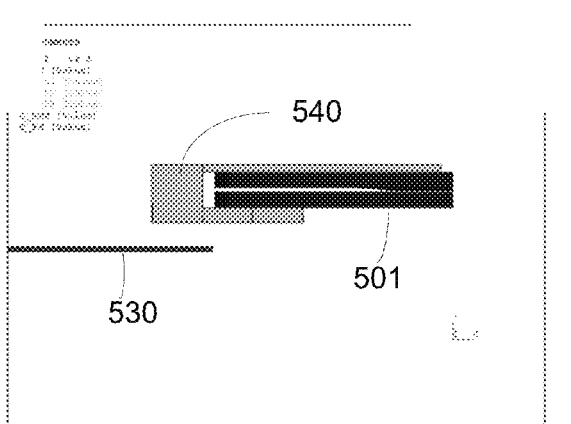
Figure 5E:
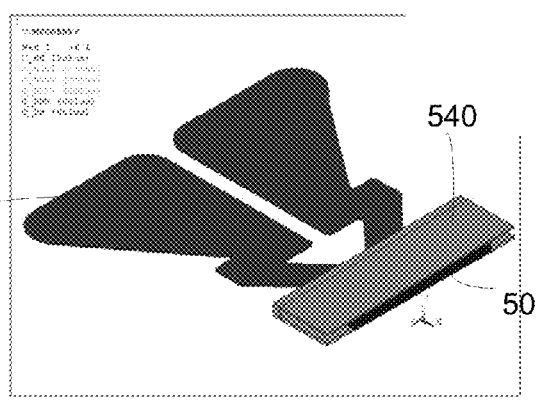
Figure 6A:
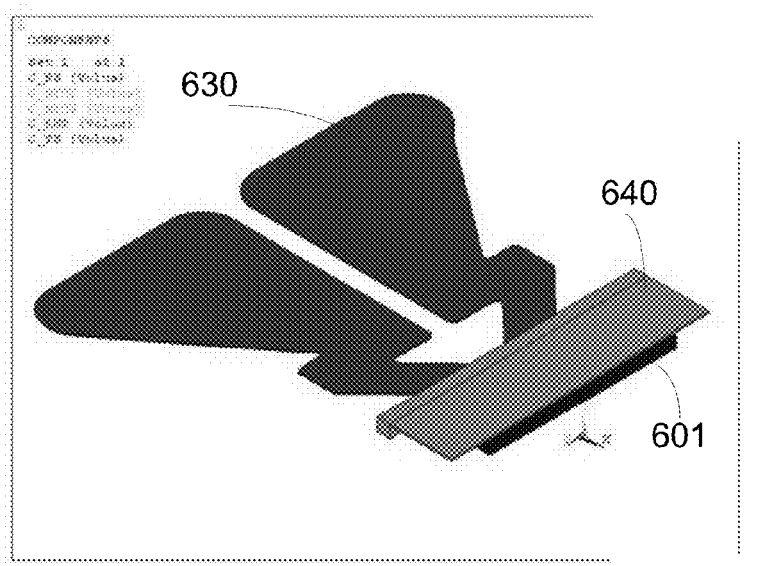
FIGS. 6A through 6D show isometric views of disclosed exemplary devices having low thermal conductivity structures positioned behind the bottom shield and above the top shield.
Figure 6B:
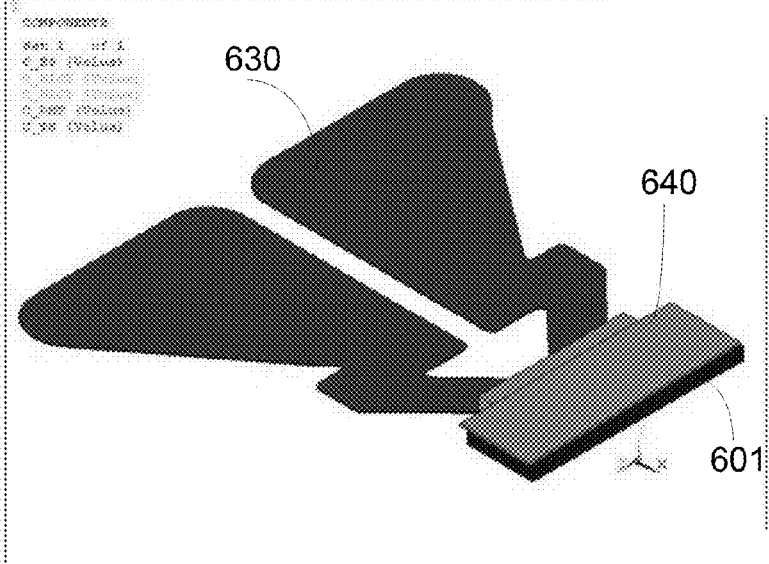
Figure 6C:
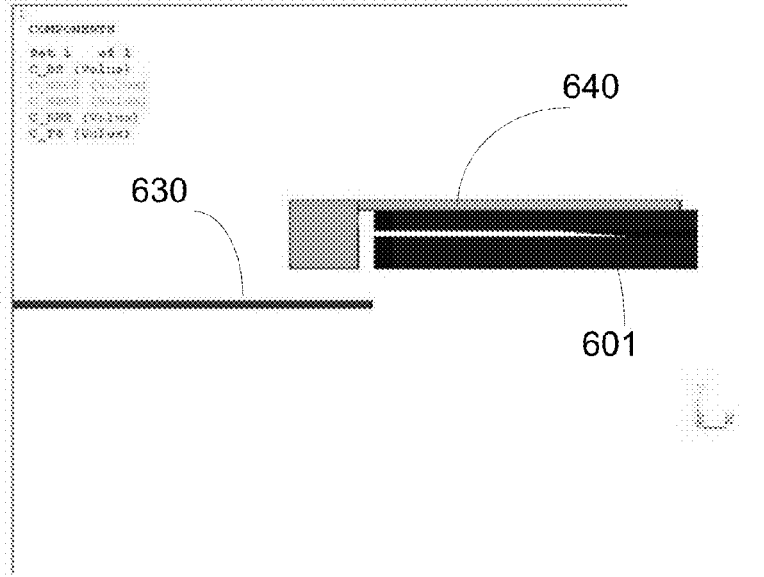
Figure 6D:
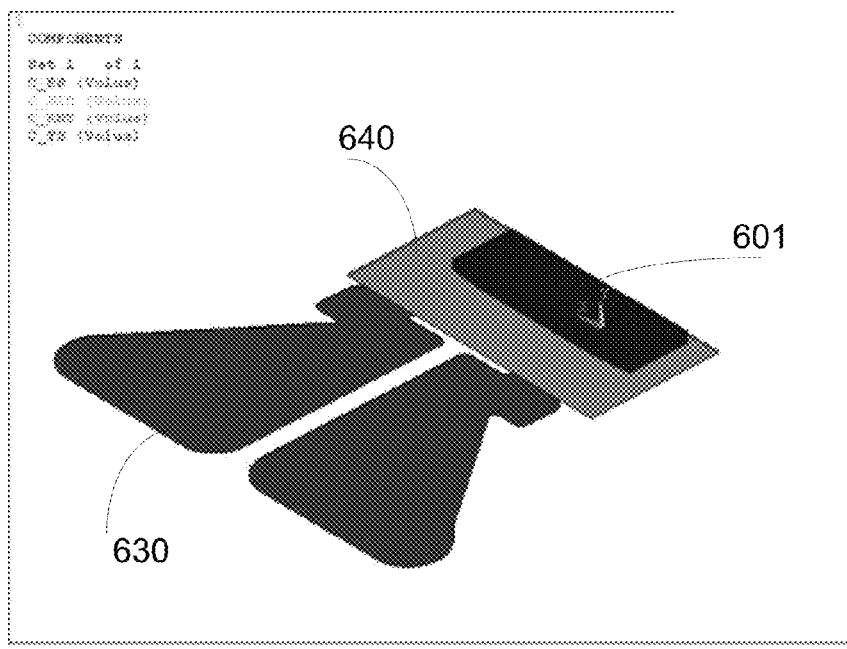

FIGS. 3A and 3B show exemplary embodiments in which the low thermal conductivity structures are configured in such a way that the entirety of the low thermal conductivity structures are positioned below the bottom shield but above the heating element. It should be noted that in some embodiments additional portions could be added to the exemplified pictured low thermal conductivity structures that are not depicted in the figures. In FIGS. 3A and 3B the heating elements are labeled 330, the shields and magnetic transducer are labeled together as 301 and the low thermal conductivity structures are labeled 340. As seen from these figures, the entirety of the low thermal conductivity structure is positioned above the heating element but below the bottom shield.

In other exemplary embodiments, the low thermal conductivity structures can be configured so that they are positioned both below the bottom shield (in the y direction as seen in FIGS. 2B and 2C for example) and behind the bottom shield (in the x direction as seen in FIGS. 2B and 2C for example). FIGS. 4A through 4K show exemplary embodiments in which the low thermal conductivity structures are configured so that portions are positioned below the bottom shield but above the heating element and behind the bottom shield. It should be noted that in some embodiments additional portions could be added to the exemplified pictured low thermal conductivity structures that are not depicted in the figures. In FIGS. 4A through 4K the heating elements are labeled 430, the shields and magnetic transducer are labeled together as 401 and the low thermal conductivity structures are labeled 440. As seen from these figures, the entirety of the low thermal conductivity structures in these particular exemplary embodiments are positioned below and behind the bottom shield but above and in front of the heating elements.

In other exemplary embodiments, the low thermal conductivity structures can be configured so that they are positioned below the bottom shield (in the y direction as seen in FIGS. 2B and 2C for example), above the top shield (in the y direction as seen in FIGS. 2B and 2C for example), and behind the bottom shield (in the x direction as seen in FIGS. 2B and 2C for example). FIGS. 5A through 5E show exemplary embodiments in which the low thermal conductivity structures are configured so that portions are positioned below the bottom shield but above the heating element, above the top shield, and behind both the top and the bottom shield. It should be noted that in some embodiments additional portions could be added to the exemplified pictured low thermal conductivity structures that are not depicted in the figures. In FIGS. 5A through 5E the heating elements are labeled 530, the shields and magnetic transducer are labeled together as 501 and the low thermal conductivity structures are labeled 540. As seen from these figures, the low thermal conductivity structures in these particular exemplary embodiments are positioned below the bottom shield but above the heating element, above the top shield, and behind both the bottom and top shield but in front of the heating element.

In other exemplary embodiments, the low thermal conductivity structures can be configured so that they are positioned above the top shield (in the y direction as seen in FIGS. 2B and 2C for example), and behind the bottom shield, the top shield, the magnetic transducer, or some combination thereof (in the x direction as seen in FIGS. 2B and 2C for example). FIGS. 6A through 6D show exemplary embodiments in which the low thermal conductivity structures are configured so that portions are positioned above the top shield, and behind both the top and the bottom shield. It should be noted that in some embodiments additional portions could be added to the exemplified pictured low thermal conductivity structures that are not depicted in the figures. In FIGS. 6A through 6D the heating elements are labeled 630, the shields and magnetic transducer are labeled together as 601 and the low thermal conductivity structures are labeled 640. As seen from these figures, the low thermal conductivity structures in these particular exemplary embodiments are positioned above the top shield, and behind both the bottom and top shield but in front of the heating element.

Low thermal conductivity structures or portions thereof can also be characterized as being located on the "sides" of the bottom shield, the top shield, the magnetic transducer, or combinations thereof. The sides of the bottom shield, the top shield, and the magnetic transducer can be further described as being along the "z" direction in FIGS. 2C and 2D for example. The exemplary embodiments depicted in FIGS. 5A, 5B, 5C, 5D, 5E, 6A, 6B and 6D have at least a portion thereof on one or more sides of the bottom shield, the top shield, the magnetic transducer, or combination thereof. Although the embodiments depicted in the exemplified structures appear to be symmetrical in nature along both sides, it should be understood that that need not be the case.

The various locations and structures of the low thermal conductivity structures or portions thereof can be chosen based on a number of different characteristics. Examples of such characteristics can include, for example the following. A low thermal conductivity structure or portion thereof below the bottom shield, and/or above the heater can serve to minimize or reduce the heat conduction to the magnetic transducer. Low thermal conductivity structures or portions thereof at various locations can also change or alter the protrusion of the magnetic transducer. In some embodiments, relative locations (adjacent the heater versus adjacent the shields) of the low thermal conductivity structure or portion thereof can change depending on desired transducer performance, heater reliability, material choice or choices for the low thermal conductivity structure or portions (thermal conductivity and coefficient of thermal expansion of the material or materials), other considerations not discussed herein, or combinations thereof.

As seen in the exemplary devices depicted in FIGS. 3 through 6, the configuration of the low thermal conductivity structure can be different. The specific configuration chosen can depend on numerous factors, including for example: the specific material(s) of the low thermal conductivity structure; the location of the portion or portions of the low thermal conductivity structure; the desired decrease in heating of the magnetic transducer; the desired location of, extent of, or both of the protrusion upon heating; other factors not discussed herein; or some combination thereof.

The structures and materials of disclosed devices also have to be chosen and configured with thermal protrusion of the reader in mind. Low thermal flux into expanding metals (such as the shields) can be problematic in affecting efficient protrusion of the reader. The relative location, configuration, specific materials selection, or combinations thereof, of a disclosed low thermal conductivity structure can be chosen to achieve a desired balance between protrusion efficiency and the temperature at the reader element.

Thus, embodiments of MAGNETIC DEVICES INCLUDING LOW THERMAL CONDUCTIVITY PORTION are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
a magnetic transducer;
top and bottom magnetic shields, wherein the top and bottom magnetic shields are adjacent the magnetic transducer on opposite surfaces thereof;
a heating element configured to provide heating along a heating path towards the first and second magnetic shields; and
a low thermal conductivity structure, wherein at least a portion of the low thermal conductivity structure is positioned along the heating path between the heating element and the magnetic transducer,
wherein the heating element is positioned below the bottom shield and at least a portion of the low thermal conductivity structure is positioned below the bottom shield but above the heating element and at least another portion of the low thermal conductivity structure is positioned behind the bottom shield but in front of the heating element.

2. The device according to claim 1, wherein the thermal resistance of the low thermal conductivity structure is greater than the thermal resistance of its surrounding so that the heat flow from the heating element to one or more of the top shield, the magnetic transducer, and the bottom shield are reduced compared to a device without the low thermal conductivity structure.

3. The device according to claim 1, wherein at least a portion of the low thermal conductivity structure is positioned above the top shield.

4. The device according to claim 3, wherein at least a portion of the low thermal conductivity structure is positioned behind the top shield, the bottom shield, or both.

5. The device according to claim 4, wherein at least a portion of the low thermal conductivity structure is positioned on a first side of the top or bottom shield, a second side of the top or bottom shield, or some combination thereof.

6. The device according to claim 1, wherein at least a portion of the low thermal conductivity structure is positioned behind the bottom shield but in front of the heating element and at least a portion of the low thermal conductivity structure is positioned above the top shield.

7. The device according to claim 1, wherein the low thermal conductivity structure comprises a material having a thermal conductivity of less than about 25 W/mK.

8. The device according to claim 1, wherein the low thermal conductivity structure comprises a material having a thermal conductivity of less than about 20 W/mK.

9. The device according to claim 1, wherein the low thermal conductivity structure comprises Constantan, Nichrome, or some combination thereof.

10. The device according to claim 1, wherein the low thermal conductivity structure comprises Nichrome.

11. The device according to claim 1, wherein the low thermal conductivity structure comprises silicon carbide, silicon oxide, photoresist, amorphous carbon, or some combination thereof.

12. A device comprising:
a magnetic transducer;
top and bottom magnetic shields, wherein the top and bottom magnetic shields are adjacent the magnetic transducer on opposite surfaces thereof;
a heating element configured to provide heating along a heating path towards the first and second magnetic shields; and
a low thermal conductivity structure, wherein at least a portion of the low thermal conductivity structure is positioned below the bottom shield but above the heating element and at least another portion of the low thermal conductivity structure is positioned behind at least the bottom shield and wherein the low thermal conductivity structure comprises Constantan, Nichrome, or some combination thereof.

13. The device according to claim 12, wherein at least a portion of the low thermal conductivity structure is positioned on a first side of the top or bottom shield, a second side of the top or bottom shield, or some combination thereof.

14. The device according to claim 12, wherein the low thermal conductivity structure comprises a material having a thermal conductivity of less than about 25 W/mK.

15. The device according to claim 12, wherein the low thermal conductivity structure comprises Nichrome.

16. A device comprising:
a magnetic transducer;
top and bottom magnetic shields, wherein the top and bottom magnetic shields are adjacent the magnetic transducer on opposite surfaces thereof;
a heating element configured to provide heating along a heating path towards the first and second magnetic shields; and
a low thermal conductivity structure, wherein at least a portion of the low thermal conductivity structure is positioned below the bottom shield but above the heating element, at least another portion of the low thermal conductivity structure is positioned behind at least the bottom shield, and the low thermal conductivity structure is made of a material having a thermal conductivity of less than about 25 W/mK, and wherein the low thermal conductivity structure comprises Constantan, Nichrome, or some combination thereof.

17. The device according to claim 16, wherein the low thermal conductivity structure comprises Nichrome.

* * * * *